United States Patent
Thomson et al.

(10) Patent No.: US 9,767,483 B2
(45) Date of Patent: Sep. 19, 2017

(54) ENABLING ACCESS TO THIRD-PARTY DIGITAL ASSETS FOR SYSTEMS THAT MARKET CONTENT TO TARGET AUDIENCES

(71) Applicant: Adobe Systems Incorporated, San Jose, CA (US)

(72) Inventors: Gordon A. Thomson, San Fransico, CA (US); Pradeep Saikalyanachakravarthi Javangula, San Jose, CA (US)

(73) Assignee: Adobe Systems Incorporated, San Jose, CA (US)

(*) Notice: Subject to any disclaimer, the term of this patent is extended or adjusted under 35 U.S.C. 154(b) by 126 days.

(21) Appl. No.: 14/806,448

(22) Filed: Jul. 22, 2015

(65) Prior Publication Data

US 2017/0024766 A1 Jan. 26, 2017

(51) Int. Cl.
  *G06F 17/00* (2006.01)
  *G06Q 30/02* (2012.01)
  *G06F 17/30* (2006.01)

(52) U.S. Cl.
  CPC ... *G06Q 30/0255* (2013.01); *G06F 17/30861* (2013.01)

(58) Field of Classification Search
  None
  See application file for complete search history.

(56) References Cited

U.S. PATENT DOCUMENTS

| | | | | |
|---|---|---|---|---|
| 8,341,195 | B1* | 12/2012 | Cole | G06Q 30/02 705/51 |
| 8,392,842 | B1* | 3/2013 | Lorenz | G06F 17/30247 382/103 |
| 2008/0082426 | A1* | 4/2008 | Gokturk | G06F 17/30256 705/26.62 |
| 2008/0301128 | A1* | 12/2008 | Gandert | G06F 17/30265 |
| 2011/0029561 | A1* | 2/2011 | Slaney | G06F 17/30247 707/772 |
| 2013/0262979 | A1* | 10/2013 | Gu | G06F 17/30873 715/234 |
| 2014/0301663 | A1* | 10/2014 | Livingston | G06T 3/40 382/298 |
| 2014/0324823 | A1* | 10/2014 | Iorio | G06F 17/30268 707/722 |
| 2015/0127673 | A1* | 5/2015 | Pogrebnyak | G06F 17/30244 707/758 |
| 2015/0169740 | A1* | 6/2015 | Gunderson | G06F 17/30575 707/749 |

(Continued)

*Primary Examiner* — Howard Cortes
(74) *Attorney, Agent, or Firm* — Wolfe-SBMC (57) ABSTRACT

Techniques for enabling access to third-party digital assets for systems that market content to target audiences are described. In one or more implementations, a request is received for alternate images of an image that is displayed in a user interface of a webpage-editing application. The image can be analyzed to determine features or other distinct aspects associated with the image. Then, the webpage-editing application can initiate a search over a network of a third-party storage to locate alternate images for the image, and tailor the search based on the features or other distinct aspects of the image. Search results can then be presented for selection via the user interface of the webpage-editing application.

20 Claims, 5 Drawing Sheets

(56) References Cited

U.S. PATENT DOCUMENTS

2015/0169994 A1\* 6/2015 Chinen ................ G06K 9/6267
   382/218
2015/0178317 A1\* 6/2015 Spielberg .......... G06F 17/30265
   382/165
2015/0363503 A1\* 12/2015 Scheuerman ....... G06F 17/2235
   715/202

\* cited by examiner

402
Receive a request for one or more recommended images
for a creative design of a webpage of a website

404
Determine user interests based on previous user-entered search
queries associated with the website, and user-selections of search
results associated with the previous user-entered search queries

406
Ascertain historical performance data
representing user interactions with the website

408
Generate a query to initiate a search of a third-party storage over a network
to locate the one or more recommended images, the query generated based
on one or more of the user interests or the historical performance data

410
Present search results as the one or more recommended images
for the creative design of the webpage based on one or more of
the determined user interests or the historical performance data

ENABLING ACCESS TO THIRD-PARTY DIGITAL ASSETS FOR SYSTEMS THAT MARKET CONTENT TO TARGET AUDIENCES

BACKGROUND

Visual webpage editing applications can allow users to customize a webpage's appearance for a given target audience. Generally, when a user wishes to change an image on the webpage, the user can open a browsing interface to select alternatives from his or her personal collection of previously-uploaded digital assets. Frequently, however, the user may not have appropriate content in his or her collection, and is then forced to look elsewhere, such as at a third-party source.

However, searching, locating, and retrieving digital assets from third-party sources can be time consuming because the user is generally required to leave the current application and perform several actions, such as for example: open an Internet browser, direct the browser to a particular search engine, enter a query to perform the search, find and select a new image, upload the new image to the user's collection, and then return to the current application interface to select and insert the new image into the webpage. Further, these conventional searches are inefficient because the searches are generally limited to the words entered by the user in the query. In addition, the resulting images may be copyright protected or have other licensing or royalty terms that are not readily available via the conventional search engines, which can be problematic for the user.

SUMMARY

Techniques for enabling access to third-party digital assets for systems that market content to target audiences are described. In one or more implementations, a search and filter interface to third-party digital assets is provided. In addition to a user's own collection of assets, the interface can provide a series of filter criteria to enable searching and selection of assets matching specific criteria within a third-party storage. The searching can include a fine-grained search of available content, using search criteria such as color, license terms, creator, and so on. The user can then select assets to use, and insert the selected assets into an experience on which the user is developing without leaving a current application or immediate workflow. The techniques described herein allow the user a much greater range of options when selecting assets to be used within an application used for testing and targeting digital experiences. Additionally, the techniques described herein reduce the need for a user to leave the application or current workflow, find and select new assets, and upload the new assets to the user's collection, all before creating a new activity.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Conventional visual webpage editing applications that are used to customize webpages generally lack an ability to initiate searches of third-party digital assets without requiring the user to leave the current application, and these applications also fail to provide recommendations for images that can be used as alternatives to an image on a webpage. However, initiating a search via conventional search engines can be time consuming and inefficient at least because the user is generally required to perform several actions to initiate the search, the search is typically limited to the words entered in the query by the user, and the results generally lack any indication of licensing or royalty terms. Thus, these techniques can fail to provide optimal results to a user that is customizing a webpage for a target audience.

Techniques for enabling access to third-party digital assets for systems that market content to target audiences are described, and the techniques provide a rich client that provides a search-and-filter interface for an enhanced user experience when customizing a webpage's appearance for a target audience. For example, a user that is customizing a webpage via a webpage-editing application, such as Adobe Target®, selects an image on the webpage and requests alternate images (e.g., additional images that are variations of the selected image), which are usable to replace the selected image. The alternate images include additional images that are different than the selected image, but which share one or more common features (e.g., a background color, an object in the image, a facial expression of a person in the image, a logo or other mark in the image, a creator of the image, licensing terms associated with the image, and so on) with the selected image.

Using the selected image, a search query is automatically generated based on some of the selected image's features to initiate a search for the alternate images. The search can include a search of the user's personal collection of digital assets, as well as a search of third-party digital assets. Then, search results, which include the alternate images, are displayed via the interface for selection. In this way, access is provided to a user to multiple variations of an image that are located at various third-party storages, without requiring the user to leave the webpage-editing application, by using an initially selected image to generate the query to search the third-party digital assets.

In at least one implementation, rather than using an initial image to generate the query, the query can be automatically generated based on user interests and/or historical performance data associated with the website. For example, a service provider determines user interests of consumers by analyzing previous user-entered search queries entered via the website, and/or user-selections of search results that are associated with the previous user-entered search queries. In addition, the service provider communicates with the website to ascertain historical performance data representing previous user interactions with the website (e.g., click-throughs, page views, length of visit, purchases, and so on). Then, the service provider generates a query based on the determined user interests and/or the historical performance data to initiate a search of the third-party storage over the network to locate images to recommend for the customization of the webpage to the target audience. Based on the search, the recommended images are displayed via the interface and are selectable without requiring the user to leave the webpage-editing application. In this way, design of the webpage is largely machine driven.

As used herein, the term "feature" of an image may refer to distinct aspects of the image, which can relate to content displayed in the image or metadata associated with the image. Some example features displayed in the image include background color, an object, a logo or other mark, a person, a facial expression of a person, an action being performed by a person or object, background scenery, and so on. In addition, some example features associated with the image include identification of a creator of the image, licensing or royalty terms, a date the image was created, and so on. Thus, a feature can include any of a variety of distinct aspects of the image, whether displayed in the image or otherwise associated with the image.

As employed herein, the term "alternate image" may refer to an image that can be used as an alternative (e.g., replacement) of another image, and which has some features in common with the other image and also some features that are different than the other image. For example, if an initial image includes a fisherman on a boat in a river, an alternate image could include a fisherman standing in a river, a fisherman on a boat on a lake, a fisherman catching a fish, a woman fishing on a boat, and so on. Thus, the alternate image can include any of a variety of images that have some similar features to an initial image and which can be used to replace the initial image.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

Figure 1:
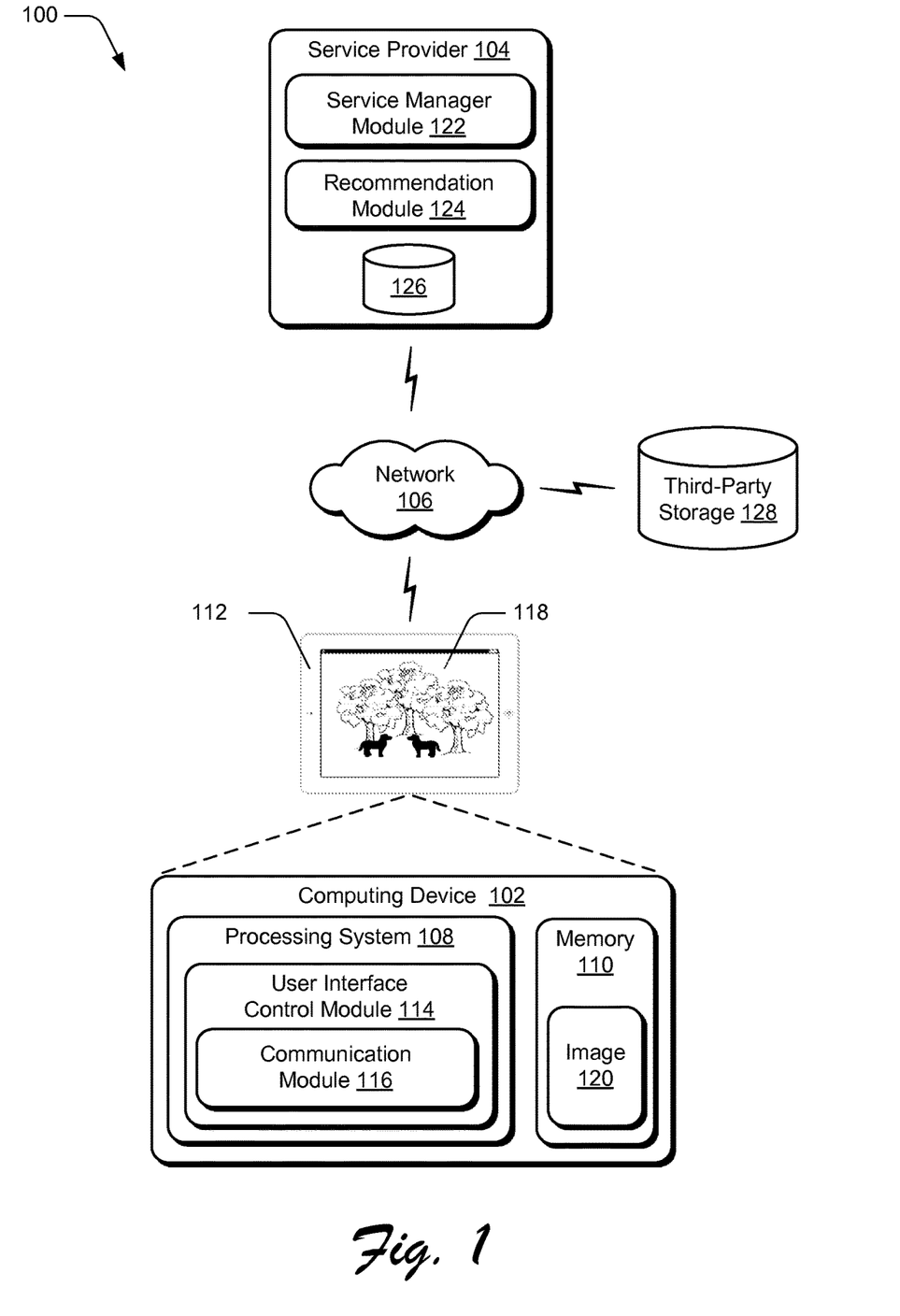
FIG. 1 is an illustration of an environment in an example implementation that is operable to employ the techniques described herein for enabling access to third-party digital assets for systems that market content to target audiences.

FIG. 1 is an illustration of an environment 100 in an example implementation that is operable to employ techniques described herein for enabling access to third-party digital assets for systems that market content to target audiences. The illustrated environment 100 includes a computing device 102 and a service provider 104 that are communicatively coupled via a network 106. The computing device 102 as well as computing devices that implement the service provider 104 may be configured in a variety of ways.

The computing devices, for example, may be configured as a desktop computer, a laptop computer, a mobile device (e.g., assuming a handheld configuration such as a tablet or mobile phone), and so forth. Additionally, a computing device may be representative of a plurality of different devices, such as multiple servers of the service provider 104 utilized by a business to perform operations "over the cloud" as further described in relation to FIG. 5.

Although the network 106 is illustrated as the Internet, the network may assume a wide variety of configurations. For example, the network 106 may include a wide area network (WAN), a local area network (LAN), a wireless network, a public telephone network, an intranet, and so on. Further, although a single network 106 is shown, the network 106 may be representative of multiple networks.

The computing device 102 is illustrated as including a variety of hardware components, examples of which include a processing system 108, an example of a computer-readable storage medium illustrated as memory 110, a display device 112, and so on. The processing system 108 is representative of functionality to perform operations through execution of instructions stored in the memory 110. Although illustrated separately, functionality of these components may be further divided, combined (e.g., on an application specific integrated circuit), and so forth.

The processing system 108 is illustrated as executing a user interface control module 114, and a communication module 116, all of which are storable in the memory 110 and as such are implemented at least partially in hardware. The user interface control module 114, and the communication module 116 are executable by the processing system 108 to cause performance of one or more operations. Other implementations are also contemplated, such as dedicated hardware components, e.g., application specific integrated circuit, fixed-logic circuitry, and so forth.

The user interface control module 114 is representative of functionality of the computing device 102 to generate and manage interaction with a user interface 118 displayed by the display device 112. For example, a user may use a keyboard, cursor control device, gesture detected by touch-screen functionality of the display device 112, verbal utterance, and so on to interact with text or other objects displayed as part of an image 120 by the display device 112.

The communication module 116 is representative of functionality to communicate via the network 106, such as with one or more services of the service provider 104. As such, the communication module 116 may be configured in a variety of ways. For example, the communication module 116 may be configured as a browser that is configured to "surf the web." The communication module 116 may also be representative of network access functionality that may be incorporated as part of an application, e.g., to provide network-based functionality as part of the application, an operating system, and so on. Thus, functionality represented by the communication module 116 may be incorporated by the computing device 102 in a variety of different ways.

The service provider 104 is representative of functionality to provide one or more network-based services. The services are managed by a service manager module 122 to support a variety of different functionality. The services (e.g., web services), for instance, may be configured to support various functionalities associated with a website, such as web traffic tracking and analysis, user search query analysis, historical performance data analysis, webpage design and construction, and so on. These services can be used obtain data that is usable to recommend images for customization of a webpage's appearance for a given target audience. Thus, the service provider 104 can provide any of a variety of different network-based services.

The service provider 104 is also illustrated as including a recommendation module 124 and storage 126. The recommendation module 124 is representative of functionality of the service provider 104 to recommend images that are usable to customize a webpage's appearance for a target audience. The recommendation module 124 can obtain recommended images from a variety of locations, such as the storage 126 at the service provider 104, the memory 110 at the computing device 102, at a third-party storage 128, or any combination thereof. In addition, the recommendation module 124 can enable licensing agreements associated with the recommended images to be readily available and executable based on selection of the recommended image.

The storage 126 may be a component of the service provider 104, may be remote from the service provider 104, or may be a third-party database. The storage 126 may be a single database, or may be multiple databases, at least some of which include distributed data. The storage 126 may be associated with an account of the user and can maintain an image, such as the image 120 or a copy of the image 120, that is displayable by the display device 112. For example, the user can login to a user account to access the storage 126. Thus, a variety of different types of storage mechanisms can be utilized for the storage 126.

The third-party storage 128 is representative of storage managed by a third-party entity. The third-party storage 128 can include a variety of digital assets of the third-party entity, such as digital files, images, artwork, stock photographs, licensed content, unlicensed content, and so on. Some of these digital assets may be copyright protected, while others may be freely accessible via the public domain. In implementations, the third-party storage 128 can be accessible based on a paid subscription.

Example Implementation

The following discussion describes example implementations of enabling access to third-party digital assets that can be employed to perform various aspects of techniques discussed herein. The example implementations may be employed in the environment 100 of FIG. 1, in the system 500 of FIG. 5, and/or in any other suitable environment.

Figure 2:
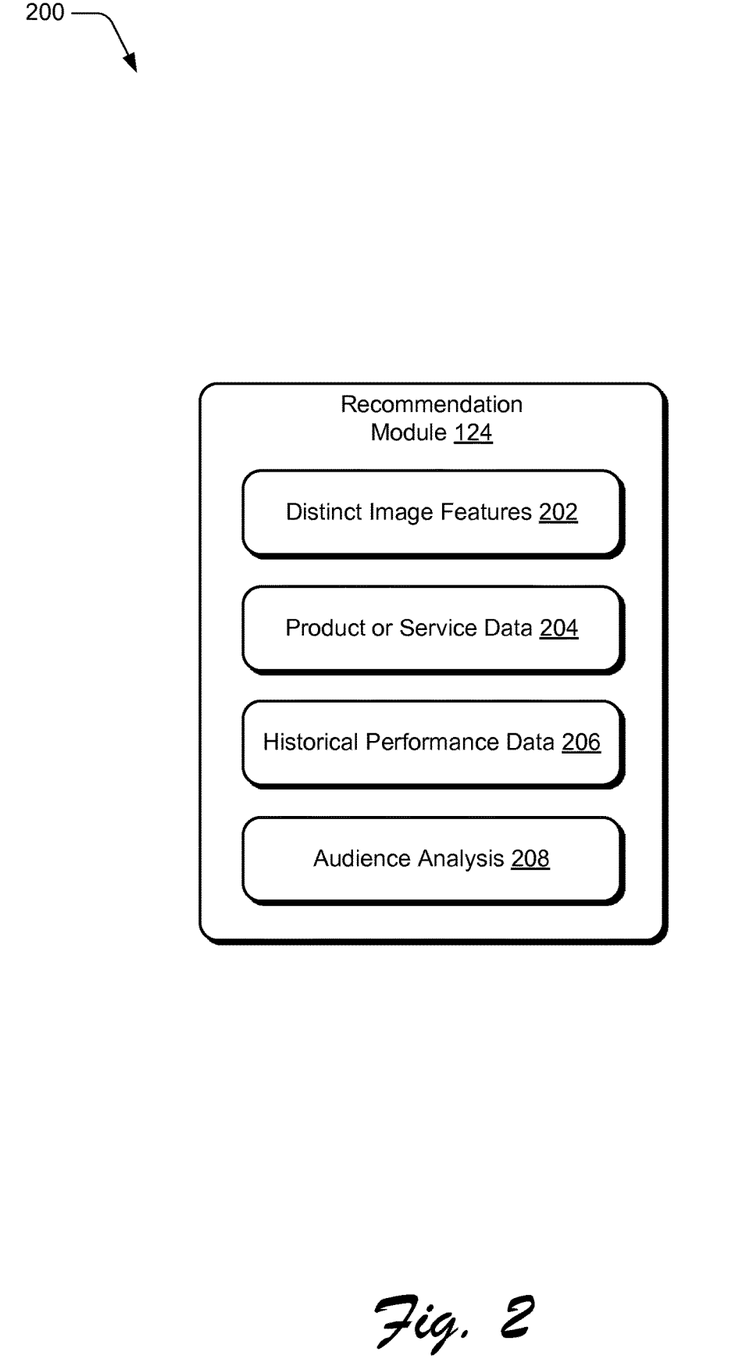
FIG. 2 depicts a system in an example implementation showing operation of a recommendation module in embodiments of the techniques described herein.

FIG. 2 depicts a system 200 in an example implementation that is operable to employ techniques for enabling access to third-party digital assets for systems that market content to target audiences. The illustrated system 200 includes the recommendation module 124 from FIG. 1. The recommendation module 124 is representative of functionality to provide seamless access to images stored in third-party databases. The recommendation module 124 can recommend images for a creative design based on any of a variety of criteria. For instance, rather than simply providing access to an entire database of images, the recommendation module 124 can construct a query to filter a search based on one or more of the criteria.

In implementations the criteria can include at least distinct image features 202, product or service data 204, historical performance data 206, and/or an audience analysis 208. The distinct image features 202 can be based on a first selected image. For example, a user can select an image and request alternate images to be recommended that are variations of the selected image. For instance, the selected image may have some distinct features, such as a background shade of blue color, a leather jacket, a person with a particular facial expression, a banana, license terms, creator of the image, and so on. By determining distinct image features 202 of the selected image, the recommendation module 124 can construct an appropriate query to filter a search for alternate images that are distinct from, and potentially different than, the selected image. Based on these distinct image features 202, the recommendation module 124 can provide alternate images that are usable to generate multiple different creative designs.

In implementations, each alternate image can share at least one common feature with the selected image and yet have other features that are different from the selected image. For example, if the selected image includes a dog running at a park, then alternate images can include a cat running at the park, a dog catching a ball at the park, a child playing at the park, a dog running in a yard, and so on. In another example, if the selected image was created by a particular artist, then the alternate images can include other artwork created by the same artist. In implementations, if the selected image includes specific licensing terms, then the alternate images can include similar licensing terms. In this way, the alternate images are variations or alternate versions of the selected image, and may have few or many differences in comparison to the selected image.

In addition or in the alternative, the recommendation module 124 can utilize product or service data 204 to obtain recommended images for different creative designs. For example, assume that the selected image is associated with a popular category of products (e.g., home appliances) of a retailer. Based on the product or service data 204, the recommendation module 124 can recommend a different set of images from within a stock photography portfolio that feature other aspects or categories of products that the retailer sells. Accordingly, the recommendation module 124 can provide machine-driven selection of images that can be included in the creative design.

Additionally or alternatively, the recommendation module 124 can utilize historical performance data 206 associated with a client website to search for recommended images. For example, the recommendation module 124 can obtain and analyze the historical performance data 206 of a client website, in terms of response rates such as click-throughs, page views, length of visit, purchases of a product or service, and so on. Based on these response rates, the recommendation module 124 can construct an appropriate query to search for and locate images to recommend for different creative designs. In this way, the images that are recommended are likely to have similar response rates to the historical performance data 206.

Also, the recommendation module 124 can use an audience analysis 208 to recommend alternate images. For example, previous searches performed via the client website by customers can be analyzed to determine previous user-selections. In implementations, a set of customers can be divided into N-groups based on any of a variety of factors, such as demographics, geographic location, or any other descriptive information associated with the customers. The recommendation module 124 can then locate a recommended image from stock photography that is targeted toward a respective group of customers. In this way, the client's own site data is usable to identify recommended images. Further discussion of these and other examples is described in the following and shown in corresponding figures.

Example Procedures

The following discussion describes techniques for enabling access to third-party digital assets that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to FIGS. 1 and 2.

Figure 3:
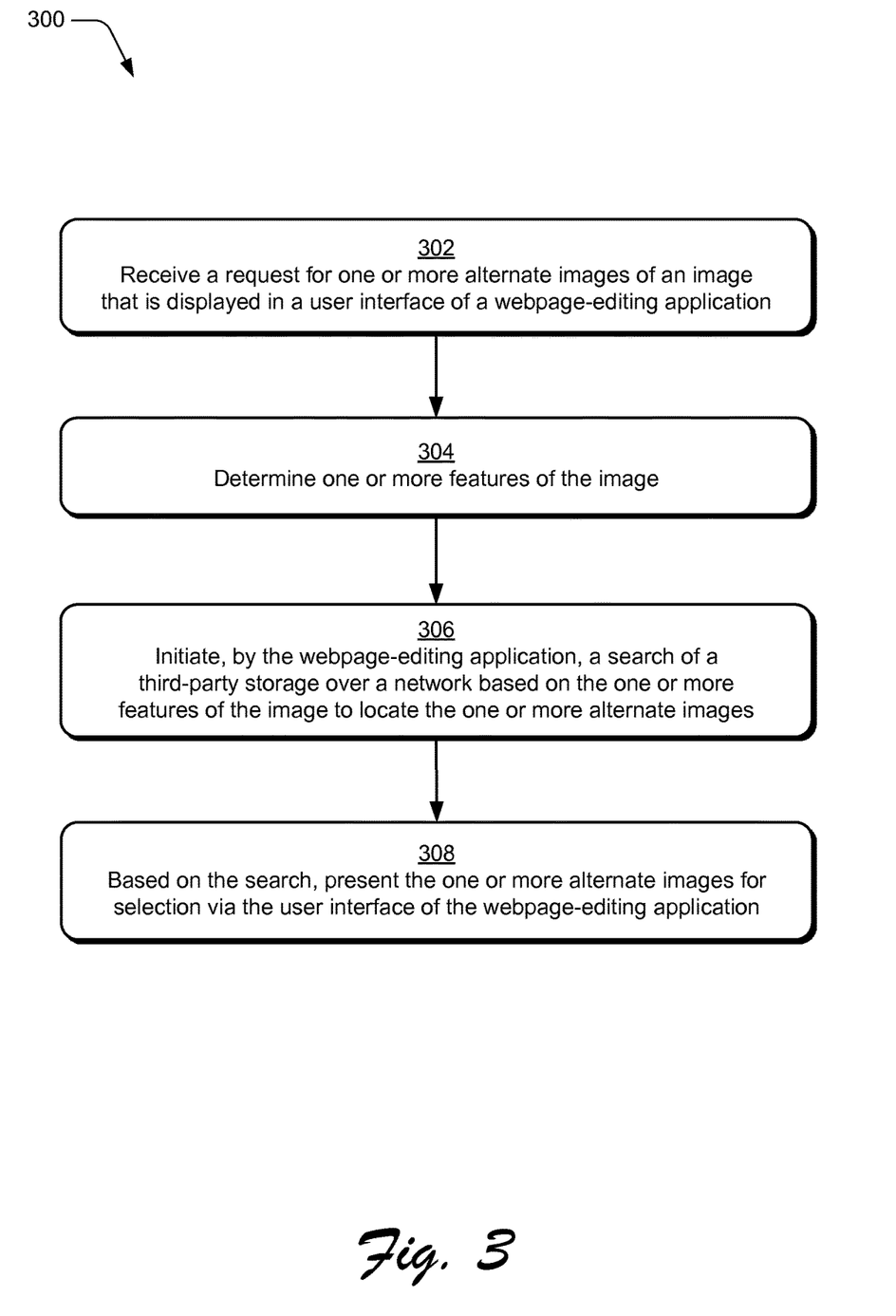
FIG. 3 is a flow diagram depicting a procedure in an example implementation in which techniques for enabling access to third-party digital assets for systems that market content to target audiences are described.

FIG. 3 is a flow diagram depicting a procedure 300 in an example implementation in which techniques for enabling access to third-party digital assets are described. A request is received for one or more alternate images of an image that is displayed in a user interface of a webpage-editing application (block 302). For instance, multiple variations of a creative design for a webpage may be desired, rather than a single creative design. A user of a webpage-editing application can, via the user interface of the webpage-editing application, select an initial image and generate a request for alternate images that are distinct and potentially different than the initial image. Accordingly, the request is generated within the webpage-editing application.

One or more features of the image are determined (block 304). This step can be performed in any suitable way. For example, any of a variety of different feature extraction techniques can be utilized to determine distinct features of the image. These distinct features are usable to identify alternate images (e.g., variations of the initial image). In implementations, the webpage-editing application can determine the image features by executing the feature extraction techniques in-application, communicating with a remote feature extraction service, or any combination thereof. Additionally, metadata associated with the image can be used to determine additional distinct features, such as creator of the image, license terms, creation data, and so on.

A search of a third-party storage is initiated by the webpage-editing application over a network based on the one or more features of the image to locate the one or more alternate images (block 306). For example, the webpage-editing application can construct a query based on the distinct features of the image to call a relevant application programming interface (API) of the third-party storage to conduct the search.

Based on the search, the one or more alternate images are presented for selection via the user interface of the webpage-editing application (block 308). For example, the results of the search are displayed and are selectable via the user interface of the webpage-editing application. In this way, the user can initiate the request for the alternate images, and view and select any of the alternate images without leaving the application or the user interface of the application. Accordingly, relatively fewer user inputs are required when compared to conventional techniques that require an Internet search via a separate browser window or tab.

Figure 4:
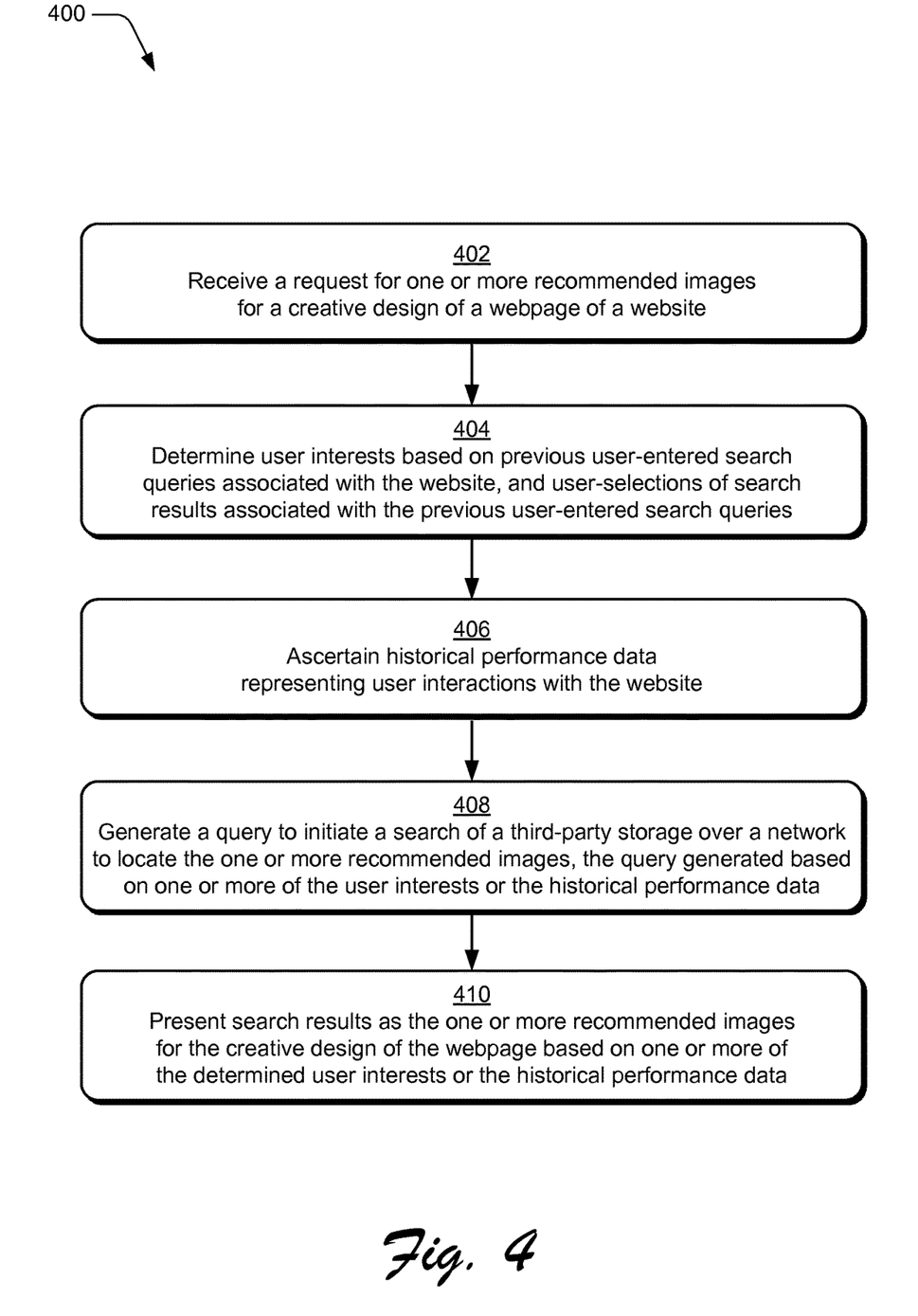
FIG. 4 is a flow diagram depicting a procedure in an example implementation in which techniques for enabling access to third-party digital assets for systems that market content to target audiences are described.

FIG. 4 is a flow diagram depicting a procedure 400 in an example implementation in which techniques for enabling access to third-party digital assets are described. A request for one or more recommended images for a creative design of a webpage of a website is received (block 402). This step can be performed in any suitable way, examples of which are described above. User interests are determined based on previous user-entered search queries associated with the web site, and user-selections of search results associated with the previous user-entered search queries (block 404). For example, an audience analysis of customers can be performed or otherwise obtained to determine user interests based on user activity. The previous user searches and selections can provide an indication of which content is selected by consumers, which can indicate a corresponding level of consumer demand.

Historical performance data representing user interactions with a website is ascertained (block 406). For example, various categories of products or services may have a relatively higher response rate in comparison to other categories of products or services. The historical performance data can be used to recommend additional aspects or categories of products to consider in the search for the recommended images. Using these additional aspects or categories to vary the search can result in additional variations of the recommended images.

A query is generated to initiate a search of a third-party storage over a network to locate the one or more recommended images, the query being generated based on one or more of the user interests or the historical performance data (block 408). In implementations, the third-party storage can include a database of stock photography, and the query can be generated to filter the search based on the user interests and/or the historical performance data described above.

Search results are presented as the one or more recommended images for the webpage design based on one or more of the determined user interests or the historical performance data (block 410). In implementations, the recommended images can be distinct and potentially different from one another to provide multiple different creative variations for the webpage design. The search results can be presented within a user interface of a webpage-editing application that generated the query. In addition, the search results can be selectable to insert into a current workflow of the webpage-editing application without leaving the webpage-editing application.

Example System and Device

Figure 5:
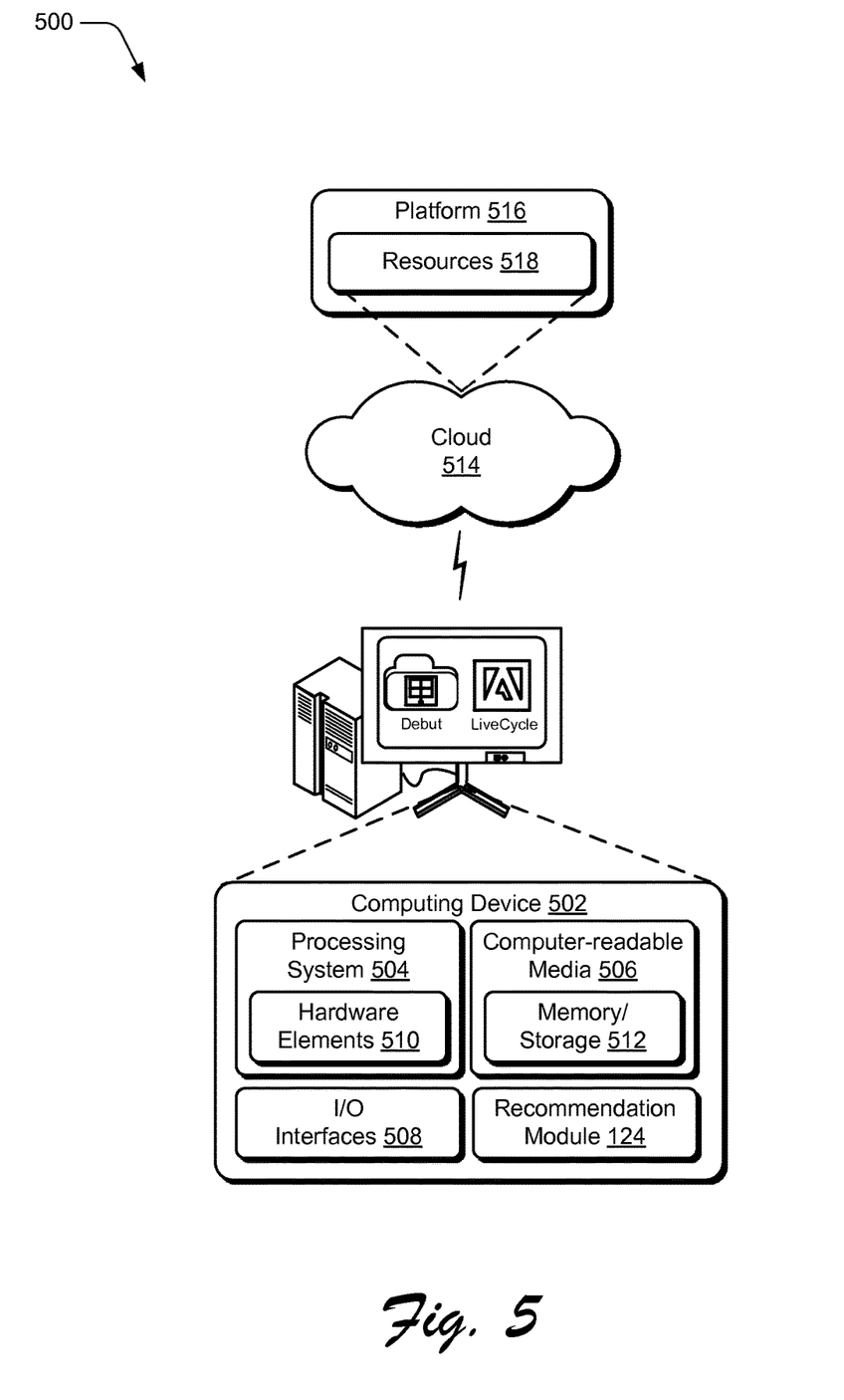
FIG. 5 illustrates an example system including various components of an example device that can be implemented as any type of computing device as described and/or utilized with reference to FIGS. 1-4 to implement embodiments of the techniques described herein.

FIG. 5 illustrates an example system generally at 500 that includes an example computing device 502 that is representative of one or more computing systems and/or devices that may implement the various techniques described herein. This is illustrated through inclusion of the recommendation module 124, which is configured to enable access to third-party digital assets for systems that market content to target audiences. The computing device 502 may be, for example, a server of a service provider, a device associated with a client (e.g., a client device), an on-chip system, and/or any other suitable computing device or computing system.

The example computing device 502 as illustrated includes a processing system 504, one or more computer-readable media 506, and one or more I/O interface 508 that are communicatively coupled, one to another. Although not shown, the computing device 502 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 504 is representative of functionality to perform one or more operations using hardware. Accordingly, the processing system 504 is illustrated as including hardware element 510 that may be configured as processors, functional blocks, and so forth. This may include implementation in hardware as an application specific integrated circuit or other logic device formed using one or more semiconductors. The hardware elements 510 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 506 is illustrated as including memory/storage 512. The memory/storage 512 represents memory/storage capacity associated with one or more computer-readable media. The memory/storage component 512 may include volatile media (such as random access memory (RAM)) and/or nonvolatile media (such as read only memory (ROM), Flash memory, optical disks, magnetic disks, and so forth). The memory/storage component 512 may include fixed media (e.g., RAM, ROM, a fixed hard drive, and so on) as well as removable media (e.g., Flash memory, a removable hard drive, an optical disc, and so forth). The computer-readable media 506 may be configured in a variety of other ways as further described below.

Input/output interface(s) 508 are representative of functionality to allow a user to enter commands and information to computing device 502, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 502 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 502. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 502, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 510 and computer-readable media 506 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 510. The computing device 502 may be configured to implement particular instructions and/or functions corresponding to the software and/or hardware modules. Accordingly, implementation of a module that is executable by the computing device 502 as software may be achieved at least partially in hardware, e.g., through use of computer-readable storage media and/or hardware elements 510 of the processing system 504. The instructions and/or functions may be executable/operable by one or more articles of manufacture (for example, one or more computing devices 502 and/or processing systems 504) to implement techniques, modules, and examples described herein.

The techniques described herein may be supported by various configurations of the computing device 502 and are not limited to the specific examples of the techniques described herein. This functionality may also be implemented all or in part through use of a distributed system, such as over a "cloud" 514 via a platform 516 as described below.

The cloud 514 includes and/or is representative of a platform 516 for resources 518. The platform 516 abstracts underlying functionality of hardware (e.g., servers) and software resources of the cloud 514. The resources 518 may include applications and/or data that can be utilized while computer processing is executed on servers that are remote from the computing device 502. Resources 518 can also include services provided over the Internet and/or through a subscriber network, such as a cellular or Wi-Fi network.

The platform 516 may abstract resources and functions to connect the computing device 502 with other computing devices. The platform 516 may also serve to abstract scaling of resources to provide a corresponding level of scale to encountered demand for the resources 518 that are implemented via the platform 516. Accordingly, in an interconnected device embodiment, implementation of functionality described herein may be distributed throughout the system 500. For example, the functionality may be implemented in part on the computing device 502 as well as via the platform 516 that abstracts the functionality of the cloud 514.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A computer-implemented method for enabling access to digital assets stored at a third-party storage for systems that market content to target audiences, the method comprising:
displaying, via a user interface of a webpage-editing application, one or more images associated with a client website;
receiving a request for one or more alternate images of a displayed image of the one or more displayed images, the request received based on a user-selection of the displayed image via the user interface of the webpage-editing application;
determining, by a recommendation module, historical performance data associated with the client website, the historical performance data representing previous user interactions with the client website;
constructing, by the webpage-editing application, a query to filter a search of a third-party storage over a network based on the selected displayed image and the historical performance data to locate the one or more alternate images;
based on the search, causing the one or more alternate images to be presented for selection via the user interface of the webpage-editing application; and
based on an additional user-selection of one said alternate image via the user interface of the webpage-editing application, replacing the selected displayed image in the user interface with the one said alternate image.

2. The computer-implemented method of claim 1, wherein the one or more alternate images include variations of the selected displayed image.

3. The computer-implemented method of claim 1, wherein the one or more alternate images are selectable to insert into a current workflow of the webpage-editing application without leaving the webpage-editing application.

4. The computer-implemented method of claim 1, wherein the third-party storage includes digital assets that are associated with an account of a user.

5. The computer-implemented method of claim 1, wherein the third-party storage is accessible based on a paid subscription.

6. The computer-implemented method of claim 1, wherein the search is further filtered based on one or more features extracted from the selected displayed image, and wherein the one or more features include license terms associated with the one or more alternate images.

7. The computer-implemented method of claim 1, wherein the search is initiated by calling an application programming interface (API) of the third-party storage to conduct the search.

8. The computer-implemented method of claim 1, further comprising further filtering the one or more alternate images based on customer activity associated with a client website.

9. The computer-implemented method of claim 1, wherein the search is based on:
an audience analysis of customers that identifies customer search queries and selections; and
a likelihood of the one or more alternate images being selected by a particular group of customers.

10. The computer-implemented method of claim 1, further comprising recommending one or more features that are usable to filter the search, wherein the one or more features are recommended based on consumer historical data associated with the client website.

11. Computer-readable storage media comprising stored instructions that are executable by a computing device to implement a recommendation module configured to perform operations comprising:
receiving a request for one or more alternate images of an image associated with a client website, the image displayed in a user interface of a webpage-editing application, the request received based on a user-selection of the image via the user interface of the webpage-editing application;
determining historical performance data representing previous user interactions with the client website;
constructing a query to filter a search of a third-party storage over a network to ascertain the one or more alternate images, the search being filtered based on the image and the historical performance data;
initiating a display of the one or more alternate images as results of the search that are selectable via the user interface of the webpage-editing application; and
replacing the image in the user interface with one said alternate image based on a user-selection of the one said alternate image via the user interface of the webpage-editing application.

12. The computer-readable storage media of claim 11, wherein the one or more alternate images are selectable to insert into a current workflow of the webpage-editing application without leaving the webpage-editing application.

13. The computer-readable storage media of claim 11, wherein the third-party storage includes digital assets that are associated with an account of a user.

14. The computer-readable storage media of claim 11, wherein the third-party storage is accessible based on a paid subscription.

15. The computer-readable storage media of claim 11, wherein the operations further include filtering the one or more alternate images based on previous user-entered search queries associated with a client website and user-selections of search results associated with the previous user-entered search queries.

16. The computer-readable storage media of claim 11, wherein initiating the search includes calling an application programming interface (API) of the third-party storage to conduct the search.

17. A system to enable access to digital assets stored at a third-party storage, the system comprising:
a memory; and
one or more processors to implement a recommendation module that is configured to:
display one or more images associated with a client website in a user interface of a webpage-editing application;
receive a request for one or more recommended images for a creative design of a webpage of the client website, the request based on a user-selection of a displayed image of the one or more images via the user interface of the webpage-editing application;
determine historical performance data associated with the client website, the historical performance data representing previous user interactions with the client website;
generate a query to initiate a search of the third-party storage over a network to locate the one or more recommended images, the query generated based on the selected displayed image and the historical performance data; and
cause search results to be presented in the user interface of the webpage-editing application as the one or more recommended images for the creative design of the webpage;
receive a user-selection of a recommended image of the one or more recommended images via the user interface of the webpage-editing application; and
replace the selected displayed image with the selected recommended image.

18. A system as recited in claim 17, wherein the historical performance data is defined in terms of response rates.

19. A system as recited in claim 17, wherein the recommendation module is further configured to determine user interests based on previous user-entered search queries associated with the client website, and user-selections of search results associated with the previous user-entered search queries.

20. A system as recited in claim 17, wherein the recommendation module is further configured to recommend one or more additional features that are usable to filter the search, wherein the one or more additional features are recommended based on consumer historical data associated with the client website.

* * * * *